US010730610B2

(12) United States Patent
Harrington et al.

(10) Patent No.: US 10,730,610 B2
(45) Date of Patent: Aug. 4, 2020

(54) FLIGHT CONTROL SYSTEM TRANSMISSION

(71) Applicant: Hamilton Sundstrand Corporation, Charlotte, NC (US)

(72) Inventors: Erik Harrington, Machesney Park, IL (US); Yuniya S. Bishop, Dixon, IL (US); Christian Miller, Beloit, WI (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 483 days.

(21) Appl. No.: 15/492,387

(22) Filed: Apr. 20, 2017

(65) Prior Publication Data
US 2018/0304995 A1 Oct. 25, 2018

(51) Int. Cl.
*B64C 13/28* (2006.01)
*F16D 3/74* (2006.01)
(Continued)

(52) U.S. Cl.
CPC ............ *B64C 13/28* (2013.01); *B64C 9/00* (2013.01); *B64C 13/30* (2013.01); *B64C 19/02* (2013.01); *F16D 3/74* (2013.01)

(58) Field of Classification Search
CPC ......... B64C 13/24; B64C 13/26; B64C 13/30; B64C 19/02; B64C 9/04; B64C 9/36; B64C 13/28; F16D 3/74
(Continued)

(56) References Cited

U.S. PATENT DOCUMENTS 1,642,775 A 9/1927 Henry
4,428,550 A * 1/1984 Evans ................... B64C 13/30
244/93
(Continued)

FOREIGN PATENT DOCUMENTS

DE 102010047512 A1 4/2012
EP 2664811 A1 11/2013
(Continued)

OTHER PUBLICATIONS

Search Report dated Sep. 18, 2018 in U310923EP, EP Application No. 18168450, 8 pages.

*Primary Examiner* — Stephen Johnson
(74) *Attorney, Agent, or Firm* — Cantor Colburn LLP

(57) ABSTRACT

An aircraft is provided. The aircraft includes fuselage, an aerodynamic element extending from the fuselage and including a main section and an adjustable section which is adjustable relative to the main section, a power distribution unit (PDU) configured to generate torque to drive an adjustment of the adjustable section, an actuator, torque tubes and elastomeric couplings. The PDU is disposed proximate to a fuselage-aerodynamic interface. The actuator is disposed along the aerodynamic element and is receptive of the torque for driving the adjustment of the adjustable section. The torque tubes transmit the torque from the PDU to the actuator and are arranged between the PDU and the actuator such that adjacent torque tubes define an obtuse angle. The elastomeric couplings are disposed at respective ends of each of the torque tubes to enable torque transmission between at least the adjacent torque tubes defining the obtuse angle.

17 Claims, 3 Drawing Sheets

(51) Int. Cl.
*B64C 19/02* (2006.01)
*B64C 13/30* (2006.01)
*B64C 9/00* (2006.01)

(58) Field of Classification Search
USPC ............................................... 244/99.2, 99.3
See application file for complete search history.

(56) References Cited

U.S. PATENT DOCUMENTS

| | | | |
|---|---|---|---|
| 4,449,955 A | | 5/1984 | Watanabe et al. |
| 4,779,820 A | | 10/1988 | Lambert |
| 4,819,182 A | * | 4/1989 | King .................. B64C 27/001 244/17.11 |
| 4,971,267 A | | 11/1990 | Fulton et al. |
| 5,573,463 A | | 11/1996 | Arlt |
| 5,823,471 A | | 10/1998 | Dazet |
| 6,200,223 B1 | | 3/2001 | Martens |
| 7,229,046 B2 | | 6/2007 | Durant |
| 9,297,422 B2 | | 3/2016 | Barnett et al. |
| 2014/0097292 A1 | * | 4/2014 | Hauber ................ B64C 9/04 244/99.2 |
| 2014/0138480 A1 | * | 5/2014 | Richter ................ B64C 13/30 244/99.3 |
| 2016/0039516 A1 | | 2/2016 | Zant |
| 2016/0356319 A1 | | 12/2016 | Chase et al. |

FOREIGN PATENT DOCUMENTS

| | | |
|---|---|---|
| GB | 478101 A | 1/1938 |
| GB | 1484865 A | 9/1977 |
| GB | 2504064 A | 1/2014 |
| WO | 2015114586 A1 | 8/2015 |

* cited by examiner

FLIGHT CONTROL SYSTEM TRANSMISSION

BACKGROUND

The following description relates to flight control systems and, more particularly, to a secondary flight control system transmission using elastomer transmission couplings.

Current secondary flight control systems transmit torque from a central power distribution unit (PDU) to outboard units via u-joints, geared transmission elements and torque tubes. The outboard units include actuators that are distributed across leading and trailing edges of aircraft wings.

With such configurations, the u-joints and the geared transmission elements enable the secondary flight control systems to accommodate various bends in wing shapes while still transmitting the necessary torque. However, it has been found that the U-joints and geared transmissions can be expensive and subject to corrosion that requires expensive sealing or corrosion preventive coating solutions.

BRIEF DESCRIPTION

According to one aspect of the disclosure, aircraft is provided. The aircraft includes fuselage, an aerodynamic element extending from the fuselage and including a main section and an adjustable section which is adjustable relative to the main section, a power distribution unit (PDU) configured to generate torque to drive an adjustment of the adjustable section, an actuator, torque tubes and elastomeric couplings. The PDU is disposed proximate to a fuselage-aerodynamic interface. The actuator is disposed along the aerodynamic element and is receptive of the torque for driving the adjustment of the adjustable section. The torque tubes transmit the torque from the PDU to the actuator and are arranged between the PDU and the actuator such that adjacent torque tubes define an obtuse angle. The elastomeric couplings are disposed at respective ends of each of the torque tubes to enable torque transmission between at least the adjacent torque tubes defining the obtuse angle.

In accordance with additional or alternative embodiments, the aerodynamic element has an angular edge along which the torque tubes extend.

In accordance with additional or alternative embodiments, the aerodynamic element includes a wing and the adjustable section comprises a slat or a flap of the wing.

In accordance with additional or alternative embodiments, the aerodynamic element includes a fin and the adjustable section comprises a rudder.

In accordance with additional or alternative embodiments, the obtuse angle is around $175°\pm\sim4°$.

In accordance with additional or alternative embodiments, the aerodynamic element includes multiple adjustable sections and the torque tubes define multiple obtuse angles.

In accordance with additional or alternative embodiments, the multiple obtuse angles are oppositely directed.

In accordance with additional or alternative embodiments, the actuator is disposed between respective elastomeric couplings of an outboard end of an inboard torque tube and an inboard end of an outboard torque tube.

In accordance with additional or alternative embodiments, the elastomeric couplings are flexible in angular misalignment and rigid in torsion.

In accordance with additional or alternative embodiments, at least one of the elastomeric couplings includes at least one of an elastomeric plate interposed between inboard and outboard metallic plates and an elastomeric spring interposed between inboard and outboard metallic plates.

According to another aspect of the disclosure, a flight control system is provided and includes a power distribution unit (PDU) configured to generate torque to drive an adjustment of an adjustable section of an aerodynamic element, an actuator disposed along the aerodynamic element, the actuator being receptive of the torque and configured to drive the adjustment of the adjustable section therewith, torque tubes configured to transmit the torque from the PDU to the actuator, the torque tubes being arranged between the PDU and the actuator such that adjacent torque tubes define an obtuse angle and elastomeric couplings. The elastomeric couplings are disposed at respective ends of each of the torque tubes to enable torque transmission between at least the adjacent torque tubes defining the obtuse angle.

In accordance with additional or alternative embodiments, the obtuse angle is around $175°\pm\sim4°$.

In accordance with additional or alternative embodiments, the torque tubes define multiple obtuse angles.

In accordance with additional or alternative embodiments, the multiple obtuse angles are oppositely directed.

In accordance with additional or alternative embodiments, the actuator is disposed between respective elastomeric couplings of an outboard end of an inboard torque tube and an inboard end of an outboard torque tube.

In accordance with additional or alternative embodiments, the elastomeric couplings are flexible in angular misalignment and rigid in torsion.

In accordance with additional or alternative embodiments, at least one of the elastomeric couplings includes at least one of an elastomeric plate interposed between inboard and outboard metallic plates and an elastomeric spring interposed between inboard and outboard metallic plates.

According to another aspect of the disclosure, a torque transmission assembly of a flight control system is provided. The torque transmission assembly includes an inboard torque tube having an outboard end, a first elastomeric coupling disposed at the outboard end, an outboard torque tube having an inboard end, the outboard torque tube being obtusely angled relative to the inboard torque tube, a second elastomeric coupling disposed at the inboard end, an actuator and a central torque tube connector. The central torque tube connector is coupled to the first and second elastomeric couplings and the actuator such that torque carried by the inboard torque tube is transmittable from the inboard torque tube to the outboard torque tube via the first and second elastomeric couplings and to the actuator.

In accordance with additional or alternative embodiments, the first and second elastomeric couplings are flexible in angular misalignment and rigid in torsion.

In accordance with additional or alternative embodiments, at least one of the first and second elastomeric couplings includes at least one of an elastomeric plate interposed between inboard and outboard metallic plates and an elastomeric spring interposed between inboard and outboard metallic plates.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As will be described below, a flight control system is provided with an output of a power distribution unit (PDU) connected to actuators via flexible elastomer couplings on torque tube ends. The flexible elastomer couplings permit adjacent torque tubes to be arranged at some non-straight angle that enables transmission routing to wing slats or flaps.

Figure 1:
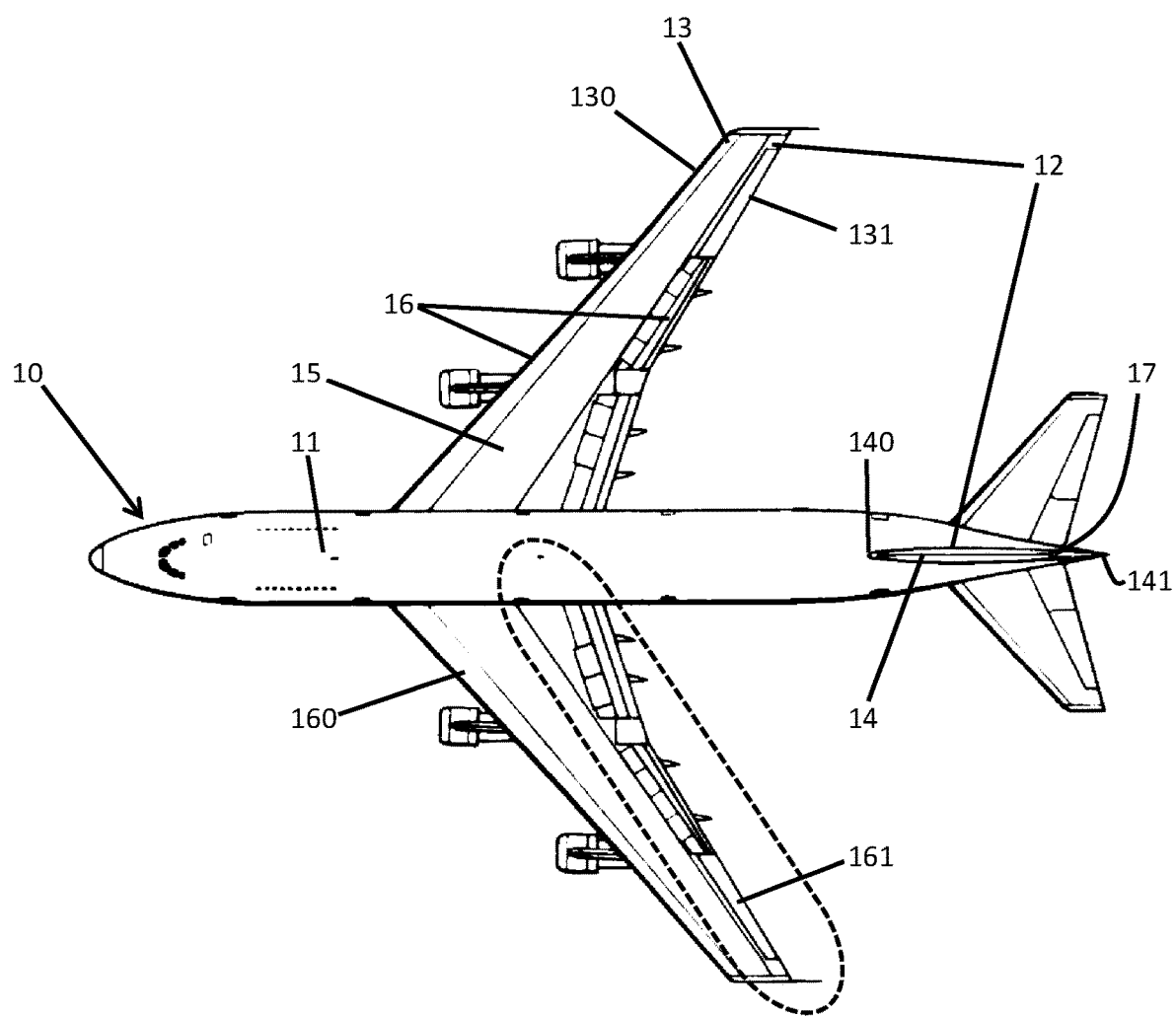
FIG. 1 is a top-down view of an aircraft in accordance with embodiments.
Figure 2:
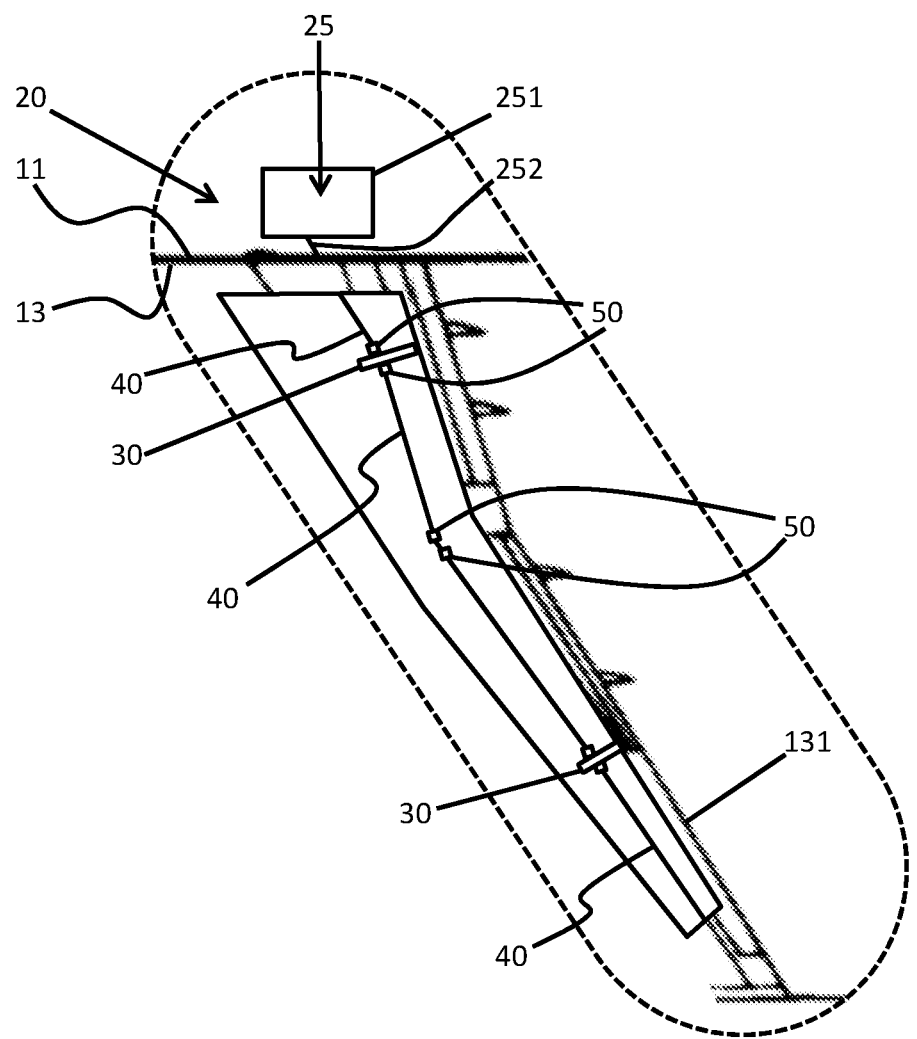
FIG. 2 is an enlarged sectional view of the encircled portion of the aircraft of FIG. 1.

With reference to FIGS. 1 and 2, an aircraft 10 is provided. The aircraft 10 includes fuselage 11 having a nose cone section and a tail section and aerodynamic elements 12 extending outwardly from the fuselage 11. As shown in FIG. 1, the aerodynamic elements 12 may include wings 13 that extend outwardly from opposite sides of the fuselage 11, a tail fin 14 that extends upwardly from the tail section of the fuselage 11 and various other wings and stabilizers. Each of the wings 13 has an angular leading edge 130 and an angular trailing edge 131 opposite the angular leading edge 130. The angularity of the angular leading edge 130 and the angular trailing edge 131 is characterized in that respective inboard and outboard portions thereof define angles (e.g., swept angles). Similarly, the tail fin 14 may include an angular leading edge 140 and an angular trailing edge 141 opposite the angular leading edge 140. Again, the angularity of the angular leading edge 140 and the angular trailing edge 141 may be characterized in that respective inboard and outboard portions thereof define angles (e.g., swept angles).

Each of the wings 13 may also include a main section 15 and adjustable or pivotable sections 16 (the following description will generally relate to pivotable sections 16, but this is done for clarity and brevity and is not intended to otherwise limit the scope of the application or the claims). The main section 15 is generally fixed relative to the fuselage 11 but for certain flapping and other flexing phenomena that occur during normal operations. The pivotable sections 16 are pivotable about respective axes thereof relative to the main section 15. For each wing 13, the pivotable sections 16 may include one or more slats 160 that extend along the angular leading edges 130 and one or more flaps 161 that extend along the angular trailing edges 131. For the tail fin 14, the pivotable section 16 may include a rudder 17 that extends along the angular trailing edge 141.

In accordance with alternative embodiments, the wings 13 and/or the tail fin 14 can include flaps that are linearly adjustable (e.g., extendable and retractable). Such flaps are controllable in a substantially similar manner as the pivotable sections 16 except that the corresponding actuators would need to convert rotational torque into linear motion as opposed to pivoting motion.

In accordance with embodiments, each of the wings 13 may include inboard and outboard slats 160 as well as inboard and outboard flaps 161. The inboard and outboard slats 160 extend along the inboard and outboard portions of the angular leading edge 130 such that the inboard and outboard slats 160 define an angle that is similar to the angle defined by the inboard and outboard portions of the angular leading edge 130. The inboard and outboard flaps 161 similarly extend along the inboard and outboard portions of the angular trailing edge 131 such that the inboard and outboard flaps 161 define an angle that is similar to the angle defined by the inboard and outboard portions of the angular trailing edge 131.

Figure 3:
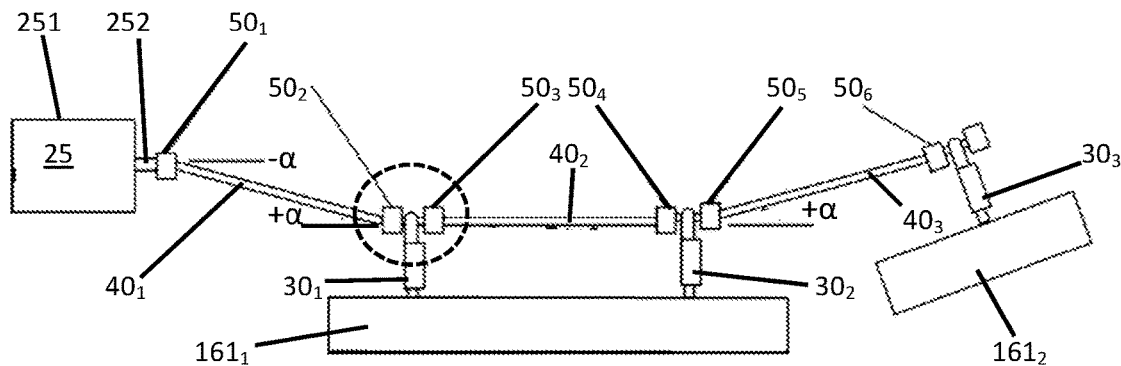
FIG. 3 is a schematic illustration of a torque transmission assembly of the aircraft of FIG. 1.
Figure 4:
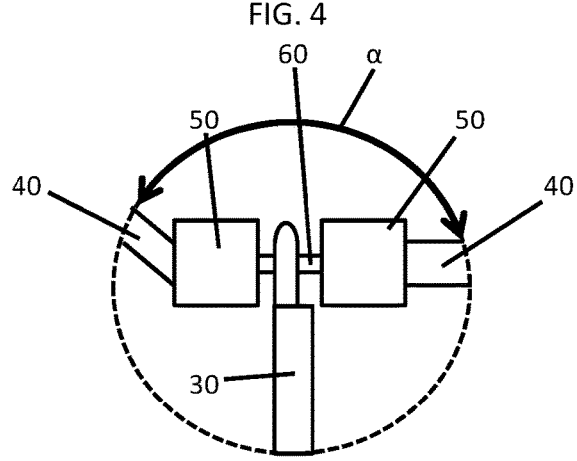
FIG. 4 is an enlarged view of the encircled portion of FIG. 3.

With continued reference to FIG. 2 and with additional reference to FIGS. 3 and 4, the aircraft 10 may further include a torque transmission assembly 20 for each wing 13 and the tail fin 14. While this torque transmission assembly 20 may be provided as a singular system for each wing 13 and the tail fin 14, embodiments exist in which the torque transmission assembly 20 is provided as separate systems for each individual wing 13 and the tail fin 14. For purposes of clarity and brevity, the following description will relate only to the case of the torque transmission assembly 20 being provided as a single separate system for only one of the wings 13.

The torque transmission assembly 20 includes a power distribution unit (PDU) 25, actuators 30 and torque tubes 40. The PDU 25 is configured to generate torque that can be used to drive a pivoting of the multiple pivotable sections 16 of the wing 13 which, in the case of FIG. 3, includes a first flap $161_1$ and a second flap $161_2$. The PDU 25 is disposed proximate to an interface between the fuselage 11 and the wing 13 and includes a torque generating body 251 and an output spline 252. The actuators 30 are disposed along the wing 13 and are receptive of the torque generated in the PDU 25. The actuators 30 are configured to drive the pivoting of the pivotable sections 16 using the received torque. That is, as shown in FIG. 3, the inboard actuators $30_1$ and $30_2$ cooperatively drive the pivoting of the first flap $161_1$ and the outboard actuator $30_3$ drives the pivoting of the second flap $161_2$. The torque tubes 40 are configured to transmit the torque from the output spline 252 of the PDU 25 to each of the actuators 30 and, to this end, the torque tubes 40 are arranged to extend along the angular trailing edge 131 (or the nearest relevant leading or trailing edge) between the PDU 25 and the actuators 30 such that adjacent torque tubes 40 define one or more obtuse angles α (see FIG. 3) that correspond to the angularity of the trailing edge 131.

Thus, for the wing 13 of FIG. 3, a first or inboard-most torque tube $40_1$ is angled in the rearward direction at obtuse angle −α relative to the output spline 252 to thereby run along a corresponding portion of the trailing edge 131 (not shown), a second or inboard torque tube $40_2$ is angled in the forward direction at obtuse angle +α relative to the first or inboard-most torque tube $40_1$ to thereby run along the corresponding portion of the trailing edge 131 and a third or outboard torque tube $40_3$ is angled in the forward direction at obtuse angle+a relative to the second or inboard torque tube $40_2$ to thereby run along the corresponding portion of the trailing edge 131.

In accordance with embodiments, the obtuse angle α may be around 175°±~4°.

Figure 5:
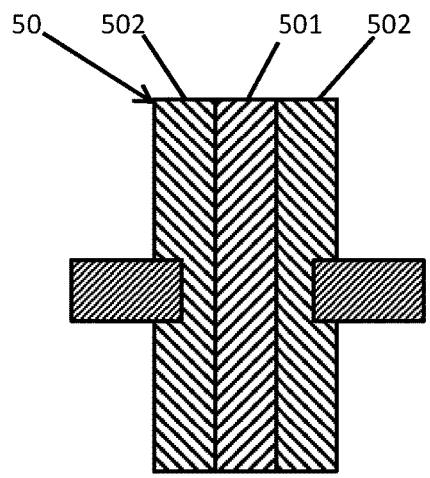
FIG. 5 is a schematic illustration of an elastomeric coupling for use in the torque transmission assembly of FIG. 3 in accordance with embodiments.
Figure 6:
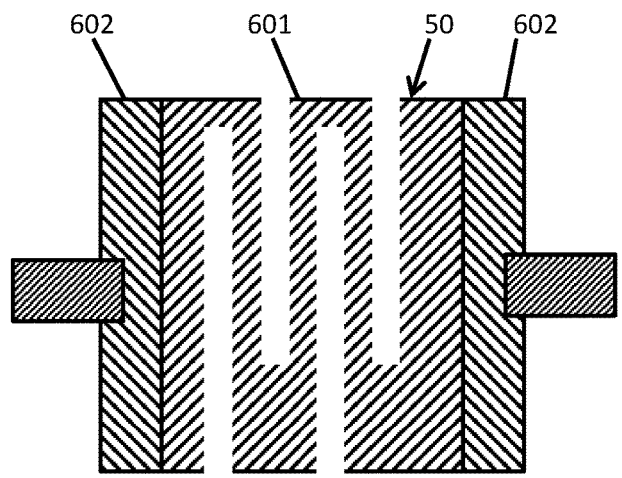
FIG. 6 is a schematic illustration of an elastomeric coupling for use in the torque transmission assembly of FIG. 3 in accordance with embodiments.

With continued reference to FIGS. 3 and 4 and with additional reference to FIGS. 5 and 6, the torque transmission assembly 20 further includes elastomeric couplings 50. The elastomeric couplings 50 are disposed at respective inboard and outboard ends of each of the torque tubes 40 to enable torque transmission between at least the adjacent torque tubes 40 defining the obtuse angle α.

That is, as shown in FIGS. 3 and 4, a first or inboard-most elastomeric coupling $50_1$ is disposed at a conjunction of the output spline 252 and the first or inboard-most torque tube $40_1$, a second or inboard elastomeric coupling $50_2$ is disposed at an outboard end of the first or inboard-most torque tube $40_1$, a third or intermediate elastomeric coupling $50_3$ is disposed at an inboard end of the second or inboard torque tube $40_2$, a fourth or intermediate elastomeric coupling $50_4$ is disposed at an outboard end of the second or inboard torque tube $40_2$, a fifth or outboard elastomeric coupling $50_5$ is disposed at an inboard end of the third or outboard torque tube $40_3$ and a sixth or outboard-most elastomeric coupling $50_6$ is disposed at an outboard end of the third or outboard torque tube $40_3$.

A central torque tube connector 60 (see FIG. 4) is provided between the second or inboard elastomeric coupling $50_2$ and the third or intermediate elastomeric coupling $50_3$ and between the fourth or intermediate elastomeric coupling $50_4$ and the fifth or outboard elastomeric coupling $50_5$. As such, torque transmitted from the output spline 252 to the first or inboard-most torque tube $40_1$ may be transmitted to the second or inboard torque tube $40_2$ via the second or inboard elastomeric coupling $50_2$, the central torque tube connector 60 and the third or intermediate elastomeric coupling $50_3$. Similarly, torque transmitted to the second or inboard torque tube $40_2$ may be transmitted to the third or outboard torque tube $40_3$ via the fourth or intermediate elastomeric coupling $50_4$, the central torque tube connector 60 and the fifth or outboard elastomeric coupling $50_5$.

The actuators 30 may be provided as linear or rotary actuators and are operably coupled to the central torque tube connectors 60 between adjacent and corresponding elastomeric couplings 50. The actuators 30 are thus receptive of the torque required for driving the pivoting of the pivoting sections 16.

The elastomeric couplings 50 are configured to be flexible in angular misalignment situations and rigid in torsion. As such, the elastomeric couplings enable the angularity of the torque tube arrangement without sacrificing the ability of the torque transmission assembly 20 to deliver torque to each of the actuators 30.

In accordance with embodiments and as shown in FIGS. 5 and 6, at least one of the elastomeric couplings 50 includes at least one of an elastomeric plate 501 that is interposed between inboard and outboard metallic plates 502 (see FIG. 5) and an elastomeric spring 601 that is interposed between inboard and outboard metallic plates 602 (see FIG. 6).

The use of elastomer couplings as described above enables the elimination of larger, heavier and more expensive solid metal transmission elements. The elastomer couplings are corrosion resistant and eliminate the need for expensive sealing and coating processes. In addition, the use of elastomer couplings can reduce system noise, provide for inherent torque limiting effects via sheer features and dampen system feedback and chatter.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An aircraft, comprising:
   fuselage;
   an aerodynamic element extending from the fuselage and comprising a main section and an adjustable section which is adjustable relative to the main section;
   a power distribution unit (PDU) configured to generate torque to drive an adjustment of the adjustable section, the PDU being disposed proximate to an interface between the fuselage and the aerodynamic element;
   an actuator disposed along the aerodynamic element, the actuator being receptive of the torque and configured to drive the adjustment of the adjustable section therewith;
   torque tubes configured to transmit the torque from the PDU to the actuator, the torque tubes being arranged between the PDU and the actuator such that adjacent torque tubes define an obtuse angle; and
   elastomeric couplings disposed at respective ends of each of the torque tubes to enable torque transmission between at least the adjacent torque tubes defining the obtuse angle.

2. The aircraft according to claim 1, wherein the aerodynamic element has an angular edge along which the torque tubes extend.

3. The aircraft according to claim 1, wherein the aerodynamic element comprises a wing and the adjustable section comprises a slat or a flap of the wing.

4. The aircraft according to claim 1, wherein the aerodynamic element comprises a fin and the adjustable section comprises a rudder.

5. The aircraft according to claim 1, wherein the obtuse angle is around $175°\pm4°$.

6. The aircraft according to claim 1, wherein the aerodynamic element comprises multiple adjustable sections and the torque tubes define multiple obtuse angles.

7. The aircraft according to claim 6, wherein the multiple obtuse angles are oppositely directed.

8. The aircraft according to claim 1, wherein the actuator is disposed between respective elastomeric couplings of an outboard end of an inboard torque tube and an inboard end of an outboard torque tube.

9. The aircraft according to claim 1, wherein the elastomeric couplings are flexible in angular misalignment and rigid in torsion.

10. The aircraft according to claim 1, wherein at least one of the elastomeric couplings comprises at least one of:
    an elastomeric plate interposed between inboard and outboard metallic plates; and
    an elastomeric spring interposed between inboard and outboard metallic plates.

11. A flight control system, comprising:
    a power distribution unit (PDU) to distribute generated torque to drive an adjustment of an adjustable section of an aerodynamic element;
    an actuator disposed along the aerodynamic element, the actuator being receptive of the torque for driving the adjustment of the adjustable section therewith;
    torque tubes by which the torque is transmitted from the PDU to the actuator, the torque tubes being arranged between the PDU and the actuator such that adjacent torque tubes define an obtuse angle; and elastomeric couplings disposed at respective ends of each of the torque tubes to enable torque transmission between at least the adjacent torque tubes defining the obtuse angle.

12. The flight control system according to claim 11, wherein the obtuse angle is around 175°±4°.

13. The flight control system according to claim 11, wherein the torque tubes define multiple obtuse angles.

14. The flight control system according to claim 13, wherein the multiple obtuse angles comprise:
   a first one of the multiple obtuse angles, which is positively directed; and
   a second one of the multiple obtuse angles, which is negatively directed.

15. The flight control system according to claim 11, wherein the actuator is disposed between an elastomeric couplings of an outboard end of an inboard torque tube and an elastomeric coupling of an inboard end of an outboard torque tube.

16. A flight control system, comprising:
   a power distribution unit (PDU) to distribute generated torque to drive an adjustment of an adjustable section of an aerodynamic element;
   an actuator disposed along the aerodynamic element, the actuator being receptive of the torque for driving the adjustment of the adjustable section therewith;
   torque tubes by which the torque is transmitted from the PDU to the actuator, the torque tubes being arranged between the PDU and the actuator such that adjacent torque tubes define an obtuse angle; and
   elastomeric couplings disposed at respective ends of each of the torque tubes to enable torque transmission between at least the adjacent torque tubes defining the obtuse angle,
   wherein the elastomeric couplings are flexible in angular misalignment and rigid in torsion.

17. A flight control system, comprising:
   a power distribution unit (PDU) to distribute generated torque to drive an adjustment of an adjustable section of an aerodynamic element;
   an actuator disposed along the aerodynamic element, the actuator being receptive of the torque for driving the adjustment of the adjustable section therewith;
   torque tubes by which the torque is transmitted from the PDU to the actuator, the torque tubes being arranged between the PDU and the actuator such that adjacent torque tubes define an obtuse angle; and
   elastomeric couplings disposed at respective ends of each of the torque tubes to enable torque transmission between at least the adjacent torque tubes defining the obtuse angle,
   wherein at least one of the elastomeric couplings comprises at least one of:
   an elastomeric plate interposed between inboard and outboard metallic plates; and
   an elastomeric spring interposed between inboard and outboard metallic plates.

* * * * *